(12) United States Patent
Langohr et al.

(10) Patent No.: US 12,098,671 B2
(45) Date of Patent: Sep. 24, 2024

(54) EXHAUST GAS TURBINE OF AN EXHAUST GAS TURBOCHARGER WITH A SEALED WASTEGATE VALVE DEVICE, AND EXHAUST GAS TURBOCHARGER

(71) Applicant: Vitesco Technologies GmbH, Hannover (DE)

(72) Inventors: Marc Langohr, Rödersheim-Gronau (DE); Viktor Misjurin, Hettenleidelheim (DE)

(73) Assignee: Vitesco Technologies GmbH, Regensburg (DE)

( * ) Notice: Subject to any disclaimer, the term of this patent is extended or adjusted under 35 U.S.C. 154(b) by 65 days.

(21) Appl. No.: 17/231,240

(22) Filed: Apr. 15, 2021

(65) Prior Publication Data
US 2021/0231047 A1 Jul. 29, 2021

Related U.S. Application Data

(63) Continuation of application No. PCT/EP2019/073271, filed on Aug. 30, 2019.

(30) Foreign Application Priority Data

Oct. 15, 2018 (DE) ..................... 10 2018 217 602.7

(51) Int. Cl.
*F02B 37/18* (2006.01)
*F01D 17/10* (2006.01)
*F02C 6/12* (2006.01)

(52) U.S. Cl.
CPC .......... *F02B 37/186* (2013.01); *F01D 17/105* (2013.01); *F02C 6/12* (2013.01); *F05D 2220/40* (2013.01); *F05D 2240/54* (2013.01)

(58) Field of Classification Search
CPC .... F01D 11/003; F01D 17/105; F02B 37/186; F02B 37/24; F02C 6/12; F05D 2220/40;
(Continued)

(56) References Cited

U.S. PATENT DOCUMENTS

| 5,261,528 A | * | 11/1993 | Bouchal | ................. B65G 39/09 198/842 |
| 10,577,958 B2 | * | 3/2020 | Kennedy | ................. F01D 17/16 |

(Continued)

FOREIGN PATENT DOCUMENTS

| CN | 103732879 A | 4/2014 |
| CN | 104271919 A | 1/2015 |

(Continued)

OTHER PUBLICATIONS

Translation of DE102009007364 to Boening; Aug. 5, 2010.*
(Continued)

*Primary Examiner* — Jesse S Bogue

(57) ABSTRACT

The disclosure relates to an exhaust gas turbine of an exhaust gas turbocharger. The exhaust gas turbine has a turbine housing and a bearing bore passing through the housing wall thereof, having a bearing bush, which is arranged in a fixed manner in the bore and in which a valve spindle of the wastegate valve device is passed outward from the interior of the turbine housing through the bearing bore of the housing wall and is mounted so as to be rotatable about its spindle axis. The bearing bush in each case intermeshes in the axial direction in the manner of a labyrinth seal, at least at one of its axial ends, with an adjusting lever connecting flange and/or a valve spindle shoulder by at least one axially extending sealing web and at least one sealing groove, complementary thereto, which are circumferential with respect to the spindle axis.

9 Claims, 3 Drawing Sheets

(58) Field of Classification Search
CPC .............. F05D 2240/54; F05D 2240/55; F05D 2260/606; F16J 15/4476; Y02T 10/12
See application file for complete search history.

(56) References Cited

U.S. PATENT DOCUMENTS

| | | | | |
|---|---|---|---|---|
| 10,590,789 | B2* | 3/2020 | Kennedy | F02B 33/40 |
| 2006/0213195 | A1* | 9/2006 | Leavesley | F02B 37/183 |
| | | | | 60/605.1 |
| 2012/0317975 | A1 | 12/2012 | Schoenherr et al. | |
| 2014/0075933 | A1* | 3/2014 | Jaegle | F16K 1/2014 |
| | | | | 60/602 |
| 2014/0290242 | A1* | 10/2014 | Isogai | F02B 37/183 |
| | | | | 60/605.1 |
| 2014/0348643 | A1* | 11/2014 | House | F04D 17/00 |
| | | | | 415/170.1 |
| 2015/0097345 | A1 | 4/2015 | House | |
| 2015/0125272 | A1* | 5/2015 | Mack | F01D 17/105 |
| | | | | 415/145 |
| 2016/0084163 | A1 | 3/2016 | Swartz | |

FOREIGN PATENT DOCUMENTS

| | | |
|---|---|---|
| CN | 204899986 U | 12/2015 |
| CN | 105443167 A | 3/2016 |
| DE | 102009030520 A1 | 1/2010 |
| DE | 102009007364 A1 | 8/2010 |
| DE | 202011109832 U1 | 4/2012 |
| DE | 10201511435 | 11/2012 |
| DE | 102011076587 A1 | 11/2012 |
| DE | 102015117750 A | 10/2015 |
| KR | 20110118483 A | 10/2011 |

OTHER PUBLICATIONS

International Search Report and Written Opinion dated Nov. 4, 2019 from corresponding International Patent Application No. PCT/EP2019/073271.

German Search Report dated Aug. 4, 2019 for corresponding German Patent Application No. 10 2018 217 602.7.

Chinese Office Action dated Feb. 22, 2022 for corresponding Chinese Patent Application No. 201980068114.0.

* cited by examiner

EXHAUST GAS TURBINE OF AN EXHAUST GAS TURBOCHARGER WITH A SEALED WASTEGATE VALVE DEVICE, AND EXHAUST GAS TURBOCHARGER

CROSS-REFERENCE TO RELATED APPLICATIONS

This application claims the benefit of PCT Application PCT/EP2019/073271, filed Aug. 30, 2019, which claims priority to German Application DE 10 2018 217 602.7, filed Oct. 15, 2018. The disclosures of the above applications are incorporated herein by reference.

TECHNICAL FIELD

The disclosure relates to an exhaust gas turbine of an exhaust gas turbocharger having a wastegate valve device, in particular of an exhaust gas turbocharger for an internal combustion engine. The disclosure furthermore relates to an exhaust gas turbocharger having an abovementioned exhaust gas turbine for an internal combustion engine.

BACKGROUND

Exhaust gas turbochargers are increasingly being used to increase power in motor vehicle internal combustion engines. More and more frequently, this is being done with the aim of reducing the overall size and weight of the internal combustion engine for the same power or even increased power and, at the same time, of reducing consumption and thus $CO_2$ emissions, in view of ever stricter legal requirements in this respect. The principle of action consists in using the energy contained in the exhaust-gas flow to increase a pressure in an intake tract of the internal combustion engine and thus to bring about better filling of a combustion chamber of the internal combustion engine with atmospheric oxygen. In this way, more fuel, such as gasoline or diesel, can be converted in each combustion process, that is to say the power of the internal combustion engine can be increased.

To this end, the exhaust gas turbocharger has an exhaust gas turbine arranged in the exhaust tract of the internal combustion engine, a radial compressor arranged in the intake tract, and a rotor bearing arranged therebetween. The exhaust gas turbine has a turbine housing and a turbine impeller arranged therein, which is driven by the exhaust-gas mass flow. The radial compressor has a compressor housing and a compressor impeller arranged therein, which builds up a boost pressure. The turbine impeller and the compressor impeller are arranged rotationally conjointly on the opposite ends of a common shaft, referred to as the rotor shaft, and thus form what is referred to as the turbocharger rotor. The rotor shaft extends axially between the turbine impeller and compressor impeller through the rotor bearing unit arranged between the exhaust gas turbine and radial compressor, and is rotatably mounted in the rotor bearing unit in the radial and axial directions in relation to the rotor shaft axis. According to this construction, the turbine impeller driven by the exhaust-gas mass flow drives the compressor impeller via the rotor shaft, thereby increasing the pressure in the intake tract of the internal combustion engine downstream of the radial compressor in relation to the fresh air mass flow, and thereby ensuring better filling of the combustion chamber of each cylinder of an internal combustion engine with atmospheric oxygen.

During operation, the internal combustion engine dynamically changes its operating states, which also requires a corresponding dynamic adaptation of the operating states of the exhaust gas turbocharger. In exhaust gas turbochargers, the speed and power of the exhaust gas turbine are frequently regulated in that a bypass valve for the exhaust-gas mass flow, referred to as a wastegate valve, which is arranged in the turbine housing, is opened or closed in a regulated manner in order to conduct a part of the exhaust gas past the turbine via a wastegate duct when required. A corresponding wastegate valve device typically has a multi-part construction, consisting of a valve spindle, which is mounted in the respective turbine housing so as to be rotatable about its spindle axis and is operatively connected to an adjusting actuator on the outside of the turbine housing for the actuation of the wastegate valve; a crank arm arranged on the valve spindle in the interior of the turbine housing, and a valve flap, which is arranged on the crank arm and rests in a sealing manner on the respective valve seat in the closed state of the wastegate valve.

For this purpose, the valve spindle is passed outward from the interior of the turbine housing through the housing wall thereof and is generally mounted so as to be rotatable about its spindle axis in the housing wall of the turbine housing by way of a bearing bush arranged in the housing wall of the turbine housing.

During the operation of the exhaust gas turbocharger, the component elements of the exhaust gas turbine, that is to say also the turbine housing and the components of the wastegate valve, are subjected to high temperatures and large temperature fluctuations owing to the prevailing high exhaust gas temperatures.

Since the valve spindle heats up more quickly than the bearing bush during operation and, as a result, the spindle may jam within the bearing bush, the thermal expansion of the valve spindle must be compensated by a larger bearing bush inside diameter in comparison with the valve spindle diameter. Via the resulting bearing gap between the bearing bush and the valve spindle, it is possible for an exhaust gas leakage mass flow to escape outward into the atmosphere from the interior of the turbine housing, it being possible for this leakage to be up to 6 liters per minute in the case of exhaust gas turbochargers according to the current prior art. However, increasingly strict statutory provisions make it necessary to restrict this exhaust gas leakage mass flow to a minimum or to completely prevent it.

To counter this problem scenario, various attempted solutions have already been indicated in the prior art, and these appear to promise success to a greater or lesser degree.

Thus, a control flap assembly of an exhaust gas turbocharger is known from DE 10 2009 030 520 A1, for example. This control flap assembly has a flap plate, a flap shaft, which is guided in the turbine housing by a bush, and a sealing device for sealing the flap shaft at at least one sealing location. The flap shaft is connected to a control rod of a drive via an outer flap lever, and is connected to the flap plate via an inner flap lever. The sealing device has at least one spring sealing lip, which presses on the sealing location under a pre-load.

A similar approach to a solution is furthermore known from DE 20 2011 109 832 U1. The wastegate assembly disclosed there has a wastegate spindle which is guided in a bush and is connected to a spindle adjusting element. A sheet metal ring, which has spring properties, is provided as a seal in the transitional region between the wastegate spindle and the spindle adjusting element. This sheet metal ring is of plate-shaped design and has a central opening, an inner ring region and an outer ring region, where the inner ring region is connected to the outer ring region by a central ring region. The inner and outer ring regions are of flat configuration and lie in planes which are perpendicular to the spindle axis and are offset relative to one another in an axial direction, while the central ring region extends obliquely to the two other ring regions in a section along the axis.

The disadvantages of the known solutions lie in increased expenditure on parts and assembly since additional component parts that have to be produced, supplied and installed with high precision are provided for sealing.

SUMMARY

Therefore, the disclosure provides an alternative concept for a turbine housing having a wastegate valve device, and an exhaust gas turbocharger, in which the exhaust gas leakage mass flow is efficiently reduced to a minimum, where, at the same time, the number of parts and the outlay on assembly is reduced in comparison with the solutions known from the prior art, i.e. avoids the abovementioned disadvantages or weaknesses and at the same time ensures particularly quiet and low-wear operation.

According to the disclosure, the proposal is an exhaust gas turbine of an exhaust gas turbocharger having a wastegate valve device which has a turbine housing having a housing wall and a bearing bore passing through the housing wall, where a bearing bush is arranged in the bearing bore of the turbine housing in such a way as to be fixed in a gastight manner. Furthermore, the exhaust gas turbine has a wastegate valve device having a valve spindle, where the valve spindle is passed outward from the interior of the turbine housing through the bearing bore of the housing wall in an axial direction in the bearing bush and is mounted in the bearing bush so as to be rotatable about its spindle axis. The valve spindle has, in the interior of the turbine housing, a valve spindle shoulder and a valve flap, which is arranged at the end of the valve spindle and, for example, is arranged on a crank arm. An adjusting lever having an adjusting lever connecting flange, and optionally further connecting elements, is arranged on the valve spindle on the outside of the turbine housing in order to actuate the wastegate valve device. Here, the bearing bush in each case intermeshes in the axial direction in the manner of a labyrinth seal, at least at one of its axial ends, with the adjusting lever connecting flange or the valve spindle shoulder or, alternatively, with the adjusting lever connecting flange and the valve spindle shoulder, by at least one axially extending sealing web and at least one sealing groove, complementary thereto, which are circumferential with respect to the spindle axis.

The disclosure furthermore provides an exhaust gas turbocharger for an internal combustion engine which has a radial compressor, a rotor bearing unit and an exhaust gas turbine, where the exhaust gas turbine has the features according to an example of the exhaust gas turbine according to the disclosure described above and below.

The advantages of the disclosure may be regarded as that efficient sealing of the valve spindle, i.e. gastight separation of the interior of the turbine housing from the environment, can be achieved solely by the arrangement and special configuration of the bearing bush in conjunction with the valve spindle and the adjusting lever and that further component parts for sealing are not required. Here, the increased sealing effect is based on the extension of the flow path of the exhaust gas leakage flow through the bearing gap between the valve spindle and the bearing bush, by what are referred to here as sealing grooves and sealing webs between the bearing bush, the valve spindle shoulder and the adjusting lever connecting flange, the grooves and webs intermeshing in one another in the axial direction in the manner of a labyrinth seal. This increases the flow resistance and thus the pressure drop in the leakage or bearing gap between the valve spindle, the bearing bush and the adjusting lever connecting flange and thus increases the sealing effect.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
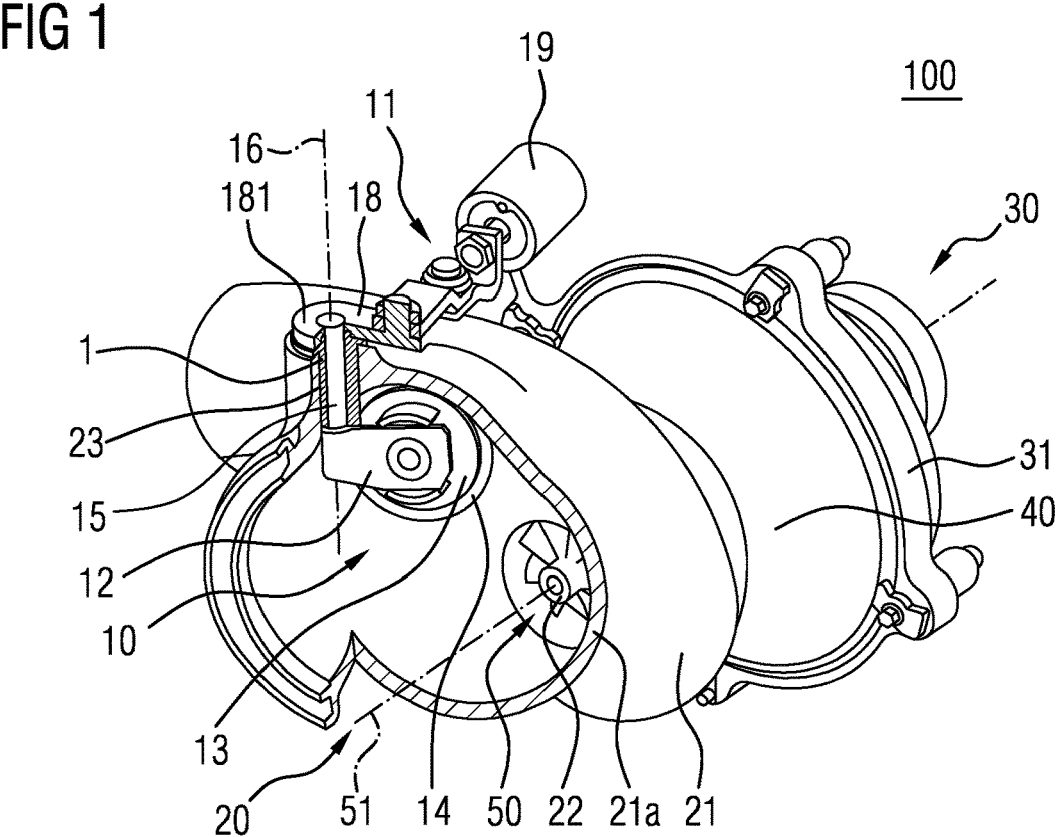
FIG. 1 shows an exemplary exhaust gas turbocharger having a cutaway turbine housing, intended to make visible the wastegate valve device.

FIG. 1 shows an exemplary exhaust gas turbocharger 100 according to the disclosure having an exhaust gas turbine 20 according to the disclosure with cutaway turbine housing 21. The sectional illustration provides an insight here into the structure and the mounting of the wastegate valve device 10 with the crank arm adjusting device 11 and the adjusting actuator 19.

As already described in the introduction, the exhaust gas turbocharger 100 has an exhaust gas turbine 20, a radial compressor 30 and a rotor bearing unit 40. The exhaust gas turbine 20 is fitted with a wastegate valve device 10. In general, a conventional exhaust gas turbocharger 100, as illustrated in FIG. 1, has a multi-part construction. Here, a turbine housing 21 that is arrangeable in the exhaust tract of the internal combustion engine, a compressor housing 31 that is arrangeable in the intake tract of the internal combustion engine, and, between the turbine housing 21 and compressor housing 31, a rotor bearing unit 40 are arranged adjacent to one another on a common turbocharger axis 51 and are connected to one another in terms of assembly.

The turbocharger rotor 50 of the exhaust gas turbocharger 100 includes the turbine impeller 22, the compressor impeller (not visible in the illustration) and the rotor shaft (not visible in the illustration).

The turbine impeller 22 and the compressor impeller are arranged on the opposite ends of the common rotor shaft and connected thereto for conjoint rotation. The rotor shaft extends in the direction of the turbocharger axis 51 axially through the rotor bearing unit 40 and is mounted therein so as to be rotatable axially and radially about its longitudinal axis, the rotor axis of rotation, by radial bearings and an axial bearing, where the rotor axis of rotation lies in the turbocharger axis 51, that is to say coincides therewith. The turbocharger rotor 50 rotates during operation about the rotor axis of rotation of the rotor shaft. The rotor axis of rotation and at the same time the turbocharger axis 51 are illustrated by the indicated centerline and identify the orientation of the exhaust gas turbocharger 100.

As is apparent from FIG. 1 by way of example on the basis of the illustrated cutaway turbine housing 21 with wastegate valve device 10, the wastegate valve device 10 has a crank arm 12 arranged in the interior of the turbine housing 21, to which crank arm the plate-shaped valve flap 13 is attached. In the closed state of the wastegate valve device 10, the valve flap 13 lies sealingly on the valve seat 14 and thus closes the wastegate duct.

The valve spindle 15 adjoining the crank arm 12 passes through the housing wall 21a in the bearing bore 23 and is mounted so as to be rotatable about its spindle axis 16 by the bearing bush 1, which combines within itself both the bearing function and the sealing function.

According to the disclosure, the bearing bush 1 used and the adjusting lever connecting flange 181 as well as the valve spindle shoulder 151 of the valve spindle 15 have axially extending sealing webs and sealing grooves, complementary thereto, which are circumferential with respect to the spindle axis 16 and which intermesh in the manner of a labyrinth seal in the axial direction. This is only indicatively recognizable in FIG. 1 due to the size of the illustration and is highlighted by the enlarged illustration in FIG. 2.

Outside the turbine housing 21, an adjusting lever 18 with an adjusting lever connecting flange 181 is attached to the valve spindle 15, which in turn is engaged by an adjusting actuator 19 (illustrated here only in truncated form) via further transmission elements of the crank arm adjusting device 11, whereby the valve spindle 15 is thus in operative connection on the outside of the turbine housing 21 with an adjusting actuator 19 for actuating the wastegate valve device 10.

Here, the adjusting actuator 19 is designed as an electromechanical actuator which has a larger force potential than previously customary pneumatic actuators. This is helpful since the required adjusting forces may rise beyond the level customary in conventional bearing assemblies, particularly in the event of a sharp temperature increase, by virtue of the sealing function of the bearing bush 1, i.e. by virtue of the sealing webs and sealing grooves engaging in one another and possibly sliding on one another.

It is self-evident that the exhaust gas turbocharger according to the disclosure is not limited to the example shown in FIG. 1, but also encompasses other examples, such as with adjustable compressor inlet openings and/or adjustable compressor diffusers and/or adjustable turbine outlet openings. In particular, examples that lie within the scope of the disclosure are especially those in which the bearing bush 1 intermeshes with the adjusting lever connecting flange 181 or the valve spindle shoulder 151 in the axial direction in the manner of a labyrinth seal only on its end within the housing interior or its end outside the housing exterior or on both its ends, in each case by at least one axially extending sealing web 6 and at least one sealing groove 7, complementary thereto, on the respective opposite side, which are circumferential with respect to the spindle axis 16. In each case, one or more sealing webs 6 can be formed on the respective end of the bearing bush 1 and sealing grooves 7, complementary thereto, can be formed on the respective opposite side of the adjusting lever connecting flange 181 or of the valve spindle shoulder 151. An arrangement of a plurality of alternating sealing webs 6 and sealing grooves 7 on the respective end of the bearing bush 1 and an arrangement of complementary design of sealing grooves 7 and sealing webs 6 on the respectively opposite side of the adjusting lever connecting flange 181 or of the valve spindle shoulder 151 should be regarded as lying within the scope of the disclosure.

Figure 2:
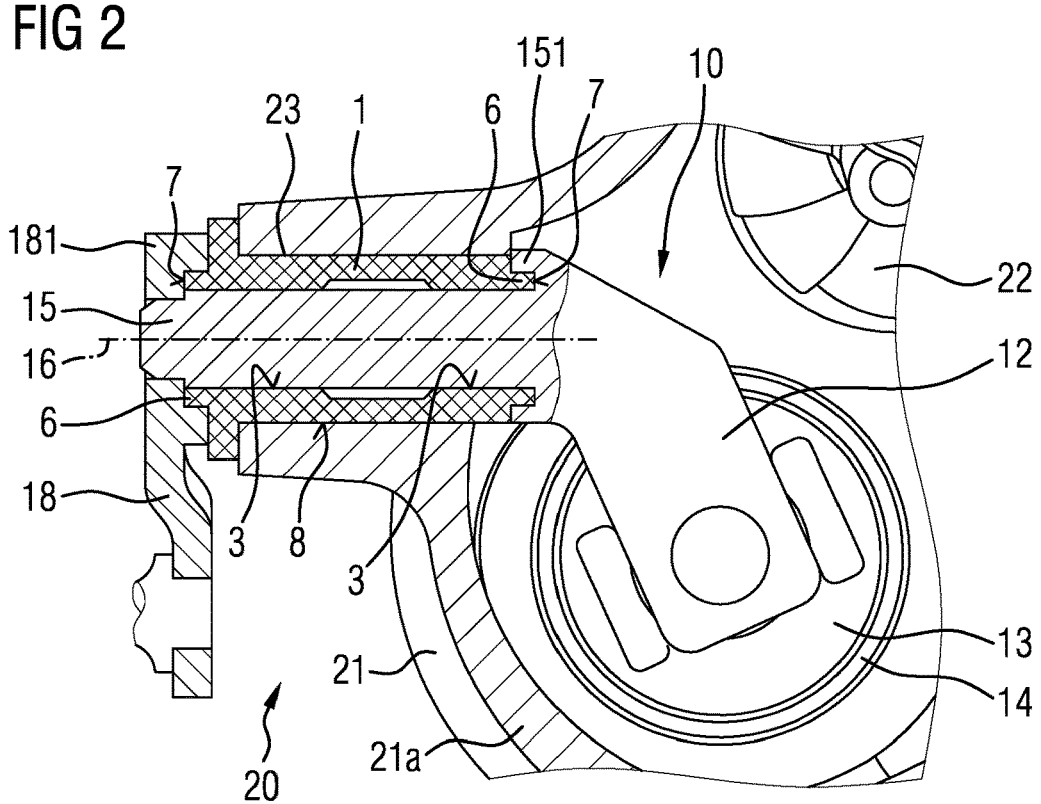
FIG. 2 shows an enlarged, simplified sectional view of a segment of the turbine housing in one example of the exhaust gas turbine, in the region of the valve spindle or the bearing bore.

In FIG. 2, the region of the turbine housing 21 in which the wastegate valve device 10 is arranged is illustrated on an enlarged scale and in section as a segment. Clearly visible here is the bearing bore 23 in the housing wall 21a of the turbine housing 21, with the bearing bush 1 arranged therein and the valve spindle 15 mounted therein so as to be rotatable about its spindle axis 16. The turbine impeller 22 is visible in the background.

A valve flap 13, which interacts with the valve seat 14, is arranged on a crank arm 12 at the end of the valve spindle 15 arranged in the interior of the turbine housing 21. Furthermore, the valve spindle 15 has a valve spindle shoulder 151 in the interior of the turbine housing 21, here directly at the shoulder of the crank arm 12, in the form of a radial projection with a larger circumference or diameter than the valve spindle 15, which cooperates with the opposite end face of the bearing bush in order to seal the bearing gap between the valve spindle 15 and the bearing bush 1.

An adjusting lever 18 with an adjusting lever connecting flange 181 is fastened for conjoint rotation on the end of the valve spindle 15 projecting into the exterior. Via this adjusting lever 18 and optionally further connecting elements, the valve spindle 15 is in operative connection on the outside of the turbine housing 21 with an adjusting actuator (not illustrated here) for actuating the wastegate valve device 10. The adjusting lever connecting flange 181 cooperates with the opposite end face of the bearing bush on the outside of the turbine housing in order to seal the bearing gap between the valve spindle 15 and the bearing bush 1 and is connected to the valve spindle, for example by a welded joint 9. For this purpose, the valve spindle 15 has, for example at its end arranged on the outside of the turbine housing, a pin which is received in a receiving bore in the adjusting lever connecting flange 181 and is fixedly connected to the adjusting lever 18 by the welded joint 9.

The bearing bush 1 is received in the bearing bore 23 provided in the housing wall 21a of the turbine housing 21.

In order to fix the bearing bush 1 in the bearing bore 23, a gastight press fit 8 can be formed between the bearing bush 1 and the bearing bore 23, thus precluding leakage between the bearing bush 1 and the housing wall 21a. This permits a particularly simple assembly process without additional individual parts for fastening the bearing sealing bush 1.

The exhaust gas turbine 20 of FIG. 2 shows that the bearing bush 1 intermeshes in the axial direction in the manner of a labyrinth seal at its axial end with the adjusting lever connecting flange 181 on the outside of the turbine housing 21 and with the valve spindle shoulder 151 in the interior of the turbine housing 21, in each case by at least one axially extending sealing web 6 and at least one sealing groove 7, complementary thereto, which are circumferential with respect to the spindle axis 16.

In the example shown, a sealing web 6 is in each case arranged on the respective end of the sealing bush 1, and a sealing groove 7, in each case of complementary design thereto, is arranged on the respectively opposite side of the valve spindle shoulder 151 and of the adjusting lever connecting flange 181, where the sealing webs 6 and sealing grooves 7 intermesh in the axial direction Ax of the spindle axis 16 in the manner of a labyrinth seal.

The exhaust gas turbine 20 illustrated in FIG. 2 shows a spindle sliding bearing 3 is formed between the bearing bush 1 and the valve spindle 15 of the wastegate valve device 10, at least over one or more partial regions or the full axial extent of the bearing bush 1. In this specific illustration, two partial regions of the bearing bush 1, each starting from one axial end of the bearing bush 1, are designed as spindle sliding bearings 3.

Figure 3:
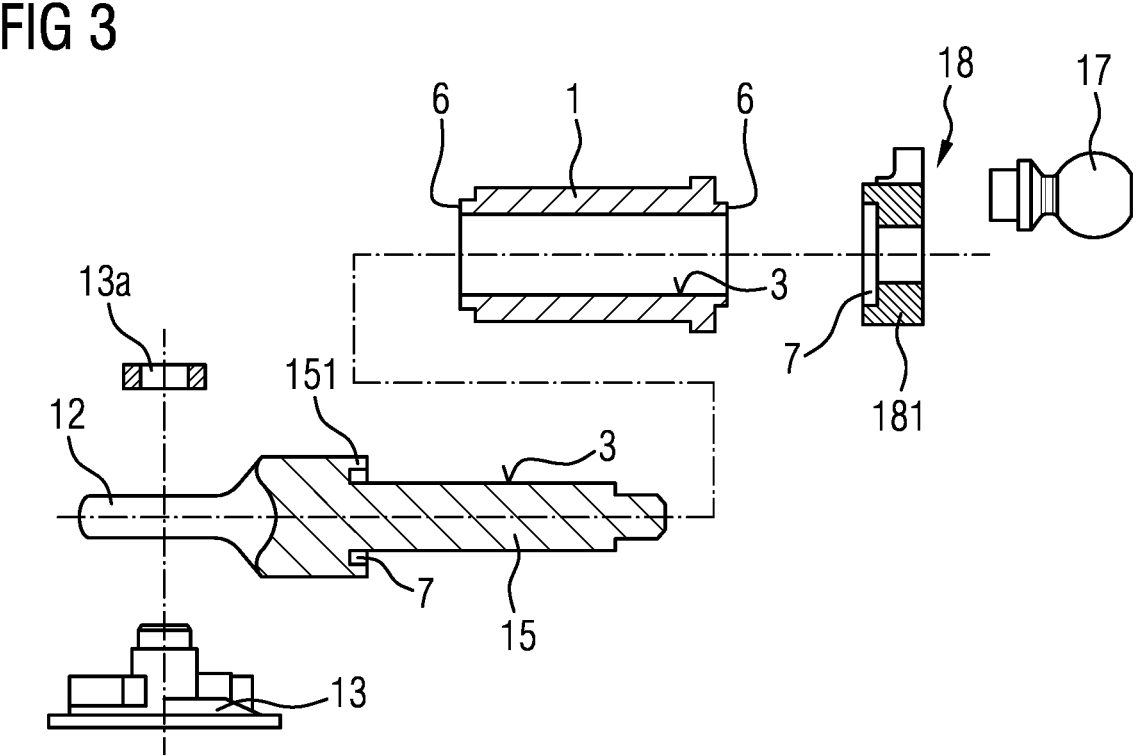
FIG. 3 shows a wastegate valve device, shown taken apart into its individual parts, in an example of the exhaust gas turbine.

FIG. 3 shows a wastegate valve device 10 of the kind also described in FIG. 2 but without the turbine housing 21 and in a disassembled arrangement, thus allowing the individual parts to be seen separately from one another. The bearing bush 1 is shown with a sealing web 6 on the ends, a valve spindle 15, with a valve spindle shoulder 151 and a sealing groove 7 formed therein, and a crank arm 12 which are illustrated separately from one another. In this example, the bearing bush inside and the lateral surface of the stem of the valve spindle are designed as a spindle sliding bearing 3 over the full axial extent of the bearing bush 1.

On the right of the bearing bush 1 in FIG. 3, the adjusting lever 18 is illustrated with its adjusting lever connecting flange 181, where the adjusting lever connecting flange has a sealing groove 7 on its side facing the bearing bush 1. Also illustrated are the valve flap 13 and a retaining washer 13a, which serves to fasten the valve flap 13 on the crank arm 12, and a spherical head 17, by which an actuator can be connected to the adjusting lever 18.

Figure 4:
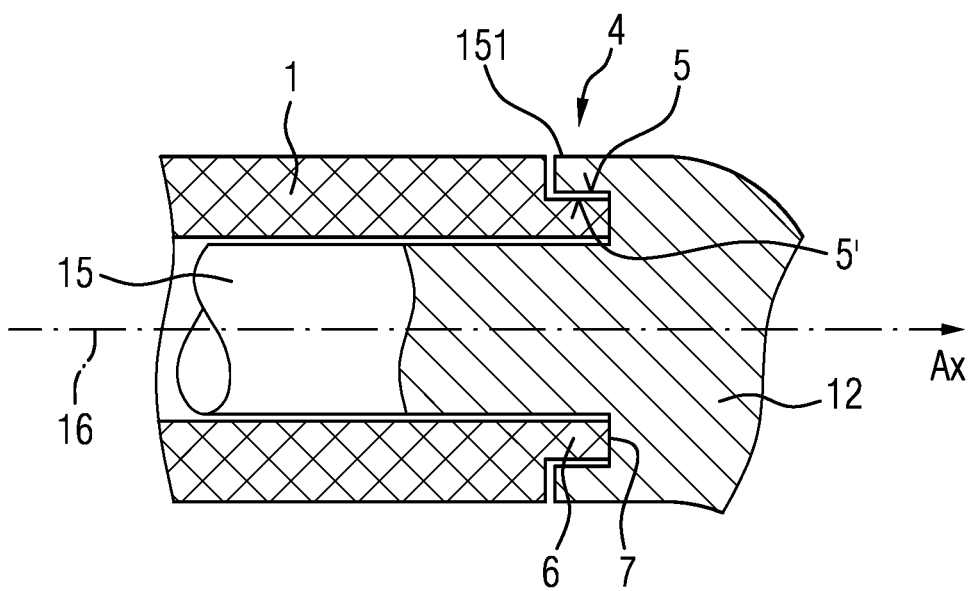
FIG. 4 shows an enlarged segment of a bearing bush and of a valve spindle, arranged therein, of an example of the exhaust gas turbine, intended to illustrate the intermeshing of the sealing web and the sealing groove in the region of the valve spindle shoulder.

FIG. 4 shows a further enlarged segment of the valve spindle 15 and bearing bush 1 in the region of the valve spindle shoulder 151 in a sectioned illustration intended to illustrate a detail of a further example of an exhaust gas turbine 20 according to the disclosure. This example of the exhaust gas turbine 20, like the example shown in FIG. 2, shows that the bearing bush 1 intermeshes in the axial direction in the manner of a labyrinth seal at its axial end with the adjusting lever connecting flange 181 on the outside of the turbine housing 21 and with the valve spindle shoulder 151 in the interior of the turbine housing 21, in each case by way of at least one axially extending sealing web 6 and at least one sealing groove 7, complementary thereto, which are circumferential with respect to the spindle axis 16. Here, however, as a supplementary feature, there is the fact that the radially arranged, mutually opposite surface portions of the sealing webs 6 and of the sealing grooves 7 are designed as bearing surfaces 5, 5' of a radial sliding bearing 4 for the valve spindle 15.

Figure 5:
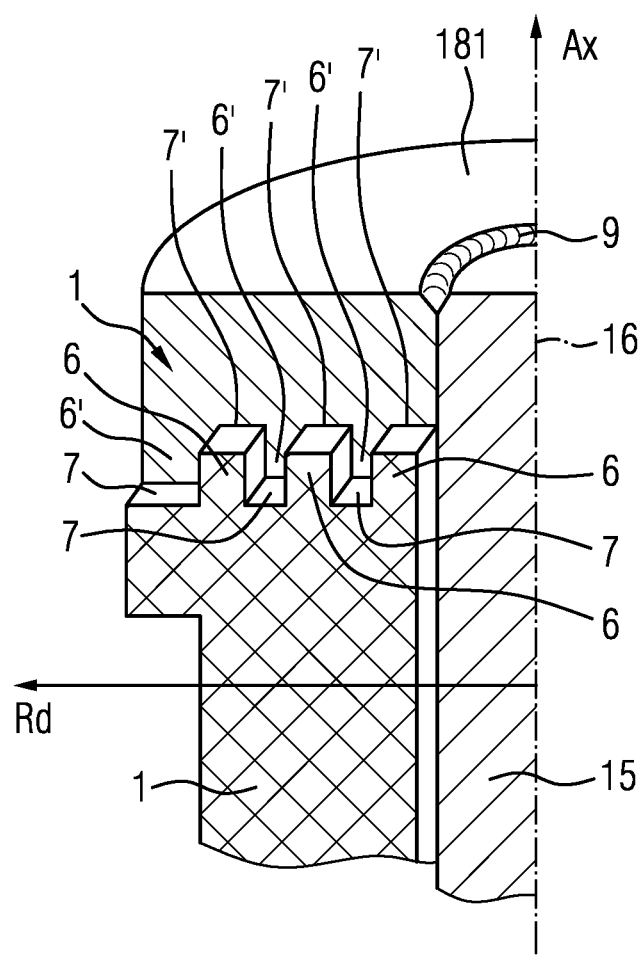
FIG. 5 shows a further enlarged sectional view of a segment of the bearing bush with a valve spindle and an adjusting lever connecting flange in another example of the exhaust gas turbine.

Finally, FIG. 5 shows a detail of two further examples of an exhaust gas turbine 20 according to the disclosure. It illustrates an enlarged sectional view of a segment of the bearing bush 1 with the valve spindle 15 accommodated therein and of an adjusting lever connecting flange 181 of the exhaust gas turbine 20, which is connected to the valve spindle 15 by a welded joint 9. As shown, at least one sealing web 6 and at least one sealing groove 7, which intermesh alternately, are formed adjacent to one another on at least one of the end faces of the bearing bush 1 and on the adjusting lever connecting flange 181 and/or the valve spindle shoulder 151.

Another configuration of this example is furthermore distinguished by the fact that in each case at least two sealing webs 6 and at least two sealing grooves 7, which intermesh alternately, are formed adjacent to one another on at least one of the end faces of the bearing bush 1 and on the adjusting lever connecting flange 181 and/or the valve spindle shoulder 151.

The illustration shown in FIG. 5 shows, by way of example on the end of the bearing bush 1, three sealing webs 6 extending in the axial direction Ax of the spindle axis 16 and arranged adjacent to one another in the radial direction Rd, which are circumferential with respect to the spindle axis 16, and, in alternation therewith, sealing grooves 7 arranged in the radial direction Rd. Arranged in a manner complementary thereto on the side of the adjusting lever connecting flange 181 facing the bearing bush 1 there are three sealing grooves 7' extending in the axial direction Ax of the spindle axis 16 and arranged adjacent to one another in the radial direction Rd, which are circumferential with respect to the spindle axis 16, and, arranged in alternation therewith, sealing webs 6'. The sealing webs 6, 6' and the sealing grooves 7, 7' intermesh in the axial direction in the manner of a labyrinth seal. In this way, the illustration includes the two abovementioned examples. In this way, the flow path in the leakage gap is further extended, thereby further increasing the flow resistance and thus the sealing effect.

A number of implementations have been described. Nevertheless, it will be understood that various modifications may be made without departing from the spirit and scope of the disclosure. Accordingly, other implementations are within the scope of the following claims.

What is claimed is:

1. An exhaust gas turbine of an exhaust gas turbocharger having a wastegate valve device, the exhaust gas turbine includes:
   a turbine housing having a housing wall and a bearing bore passing through the housing wall,
   a bearing bush arranged in the bearing bore of the turbine housing in such a way as to be fixed in a gastight manner,
   a wastegate valve device having a valve spindle, the valve spindle is passed outward from an interior of the turbine housing through the housing wall in an axial direction in the bearing bush and is mounted in the bearing bush so as to be rotatable about its spindle axis, and the valve spindle includes, in the interior of the turbine housing, a valve spindle shoulder and a valve flap arranged at an end of the valve spindle, and
   an adjusting lever having an adjusting lever connecting flange and arranged on the valve spindle on an outside of the turbine housing to actuate the wastegate valve device,
   wherein the bearing bush intermeshes in the axial direction in the manner of a labyrinth seal, its axial end outside the turbine housing with the adjusting lever connecting flange and on its axial end inside the turbine housing with the valve spindle shoulder, in each case by at least one axially extending sealing web and at least one sealing groove, complementary thereto, which circumferentially surround the spindle axis.

2. The exhaust gas turbine as claimed in claim 1, wherein the radially arranged, mutually opposite surface portions of the sealing webs and of the sealing grooves are designed as bearing surfaces of a radial sliding bearing for the valve spindle.

3. The exhaust gas turbine as claimed in claim 1, wherein the respective sealing web is formed on an end face of the bearing bush, and the sealing groove, complementary thereto, is formed on the adjusting lever connecting flange or the valve spindle shoulder.

4. The exhaust gas turbine as claimed in claim 1, wherein the at least one sealing web and the at least one sealing groove are formed adjacent to one another on at least one of the end faces of the bearing bush and on the adjusting lever connecting flange and/or the valve spindle shoulder.

5. The exhaust gas turbine as claimed in claim 1, wherein in each case at least two sealing webs and at least two sealing grooves, which intermesh alternately, are formed adjacent to one another on at least one of the end faces of the bearing bush and on the adjusting lever connecting flange and/or the valve spindle shoulder.

6. The exhaust gas turbine as claimed in claim 1, wherein a gastight press fit is formed between the bearing bush and the bearing bore in order to fix the bearing bush in the bearing bore of the housing wall of the turbine housing.

7. The exhaust gas turbine as claimed in claim 1, wherein a spindle sliding bearing is formed between the bearing bush and the valve spindle of the wastegate valve device, at least over one or more partial regions or the full axial extent of the bearing bush.

8. An exhaust gas turbocharger for an internal combustion engine having a radial compressor, a rotor bearing unit and an exhaust gas turbine, wherein the exhaust gas turbine is designed according to claim 1.

9. An exhaust gas turbine of an exhaust gas turbocharger having a wastegate valve device, the exhaust gas turbine includes:

a turbine housing having a housing wall and a bearing bore passing through the housing wall, a bearing bush arranged in the bearing bore of the turbine housing in such a way as to be fixed in a gastight manner, a wastegate valve device having a valve spindle, the valve spindle is passed outward from an interior of the turbine housing through the housing wall in an axial direction in the bearing bush and is mounted in the bearing bush so as to be rotatable about its spindle axis, and the valve spindle includes, in the interior of the turbine housing, a valve spindle shoulder and a valve flap arranged at an end of the valve spindle, and an adjusting lever having an adjusting lever connecting flange is arranged on the valve spindle on an outside of the turbine housing to actuate the wastegate valve device, wherein the bearing bush intermeshes in the axial direction in the manner of a labyrinth seal, at least at one of its axial ends, with the adjusting lever connecting flange and/or the valve spindle shoulder by at least one axially extending sealing web and at least one sealing groove, complementary thereto, which are circumferential with respect to the spindle axis, and wherein at least two sealing webs and at least two sealing grooves, which intermesh alternately, are formed adjacent to one another on at least one of the end faces of the bearing bush and on the adjusting lever connecting flange and/or the valve spindle shoulder.

* * * * *